United States Patent Office 3,425,984
Patented Feb. 4, 1969

3,425,984
POLYOLEFINS STABILIZED BY 2,3-
DIHYDROXYQUINOXALINE
Robert H. Patton, Baytown, Tex., and Delos E. Bown,
White Plains, N.Y., assignors to Esso Research and
Engineering Company
No Drawing. Continuation-in-part of application Ser.
No. 385,477, July 27, 1964. This application May
3, 1967, Ser. No. 635,647
U.S. Cl. 260—45.8        15 Claims
Int. Cl. C08f 45/58, 29/02

ABSTRACT OF THE DISCLOSURE

The contaminating effect of a multivalent metal on a solid polymer of an alpha olefin having 2 to 8 carbon atoms in the molecule containing at least one antioxidant at a concentration sufficient to inhibit oxidative attack of the polymer in the absence of said metal is inhibited by the presence in said polymer of a sufficient concentration of 2,3-dihydroxyquinoxaline.

CROSS-REFERENCE TO RELATED APPLICATION

This application is a continuation-in-part of Ser. No. 385,477 entitled "Stabilizer for Polyolefins" filed July 27, 1964, for Robert H. Patton and Delos E. Bown, now abandoned.

BACKGROUND OF THE INVENTION

Field of the invention

The present invention is directed to an improved composition including a polyolefin. More particularly, the invention is concerned with a polyolefin composition which has improved oxidative stability, thermal stability, and color. In its more specific aspects, the invention is directed to a polypropylene composition which has been stabilized against degradation caused by oxidation and exposure to elevated temperatures and against color instability.

Description of the prior art

It is known to use various antioxidants, inhibitors, and/or stabilizers in solid polymers of alpha olefins having 2 to 8 carbon atoms in the molecule. The antioxidants, inhibitors, and/or stabilizers inhibit and/or stabilize the solid polymers against the deleterious effects of oxygen, heat, aging, light, and the like. It is customary to use one or more of such antioxidants, inhibitors, and/or stabilizers. However, these many and various materials alone or together are not effective in combating the deleterious effects on these solid polymers of multivalent metals such as copper.

SUMMARY OF THE INVENTION

The present invention may be briefly described as a polymer composition which consists essentially of a solid polymer of an alpha olefin having 2 to 8 carbon atoms in the molecule and which contains a minor but effective amount of 2,3-dihydroxyquinoxaline sufficient to overcome the contaminating effects of a multivalent metal and at least one antioxidant, inhibitor, or stabilizer at a concentration sufficient to inhibit the oxidative attack of the polymer in the absence of said metal.

DESCRIPTION OF THE PREFERRED EMBODIMENTS

In the practice of the present invention, the 2,3-dihydroxyquinoxaline may be employed in an amount within the range from about 0.01 to about 1.0 percent by weight of the solid polymer. An amount within the range from about 0.25 to about 0.75 percent by weight may be preferred.

The 2,3-dihydroxyquinoxaline is represented by the Formula I:

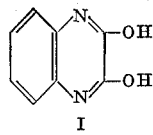

It is contemplated that the composition of the present invention may contain at least one antioxidant, inhibitor, or stabilizer.

The antioxidant, inhibitor, and/or stabilizer may be illustrated by compounds such as dipinene diphenol and other stabilizers such as exemplified by $\alpha^2,\alpha^6$-bis(3-t-butyl-5-methyl-2-hydroxyphenyl) mesitol, 2,6-di-t-butyl-4-methylphonol, 4,4'-thiobis(3-methyl-6-t-butylphenol), 4,4'-1,1 - butylidenebis(3 - methyl-6-t-butylphenol), 2,6-bis($\alpha$ - phenethyl)-4-methylphenol, 2,6-bis(1,1-dimethyl-n-octyl)-4-methylphenol, 2,2' - methylenebis(4-methyl-6-t-butylphenol), and 4,4' - methylenebis(2,6-di-t-butylphenol).

Other inhibitors or stabilizers are illustrated by the dialkyl sulfides having 12 to 30 carbon atoms in the molecule of which illustrative members are dioctadecyl sulfide, didocosyl sulfide, diheptadecyl sulfide, ditricosyl sulfide, dipentadecyl sulfide, ditetracosyl sulfide, dinonadecyl sulfide, dipentacosyl sulfide, dieicosyl sulfide, dihexacosyl sulfide, dihenicosyl sulfide, and diheptacosyl sulfide. Other sulfur-containing compounds may be used, of which dilauryl thiodipropionate is preferred. Other members of this homologous series such as dihexadecyl thiodipropionate, disteroyl thiodipropionate and dibehenyl thiodipropionate may be used. Other sulfur-containing compounds such as 19,25-dithiahentetetracontane, 19,24-dithiatetracontane, bis(octadecylmercapto)-p-xylylene and bis(tetradecylmercapto)-p-xylylene may also be employed.

Other antioxidants, inhibitors, or stabilizers may be used with the 2,3-dihydroxyquinoxaline of the present invention, such as but not limited to amines, aminophenols, phosphites, polyquinolines, thiophosphites, substituted pyrimidines, butylated hydroxyanisole, butylated hydroxytoluene, phenylamine derivatives, derivatives of phenothiazine, trihydroxyphenylketones, alkylidene bisphenols, the condensation reaction products of p-alkylated phenols with acetone, and synergistic combinations of two or more of these and other antioxidants, inhibitors, and/or stabilizers, and the like, known in the art as effective in overcoming the deleterious effects of heat, aging, oxidation, and the like on solid polymers of alpha mono-olefins having 2 to 8 carbon atoms in the molecule.

The dipinene diphenol employed in the present invention is a resinous material with the pinene and phenol being present in a ratio of about 1:1. The dipinene diphenol has a molecular weight in the range from about 450 to about 550 and may be represented by the formula: $(C_{10}H_{16})_2 (C_6H_5OH)_2$. The dipinene diphenol is produced by reacting 1 mol of pinene and 1 mol of phenol in the presence of boron trifluoride etherate as a catalyst at a temperature from about 70° F. to about 122° F. to form the resinous dipinene diphenol product. In preparing the dipinene diphenol, a mixture of alpha and beta pinene in a benzene solution of phenol is reacted. The product is washed with hot water to remove catalyst and unreacted material. Thereafter, the washed product is dried, filtered, and then distilled to remove benzene and any light fraction. The material remaining is the dipinene diphenol. The dipinene diphenol has a ring and ball melting point in the range from about 75° C. to about 150° C. and is completely slouble in methanol.

The amount of the antioxidant, inhibitor, or stabilizer may be an amount within the range from about 0.01 to about 1.0 percent by weight of the composition and an amount within the range from about 0.01 to about 0.5 percent by weight may be preferred.

The polyolefin polymers employed in the practice of the present invention are polymers of alpha mono-olefins having 2 to 8 carbon atoms in the molecule and may suitably be exemplified by polyethylene, polypropylene, ethylene-propylene copolymers, ethylene-butene-1 copolymers, ethylene-pentene-1 copolymers, and the like, having molecular weights in the range from about 10,000 to about 1,000,000. These polymers are produced by polymerization of the corresponding alpha mono-olefins employing a Ziegler type polymerization catalyst which is obtained by at least partially reducing in solution in a diluent a halide of an amphoteric metal selected from Groups IV-B, V-B, VI-B, and VIII of the Periodic System of Elements, such as the Henry D. Hubbard Periodic Chart of the Elements, 1947 Ed. revised by W. F. Meegers; W. M. Welch Mfg. Co., Chicago, Ill. Examples of suitable halides from which the catalyst is prepared are the halides of titanium, zirconium, hafnium, thorium, uranium, vanadium, columbium, tantalum, chromium, molybdenum, tungsten and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, the amphoteric metal halide is reduced in solution in a nonreactive, nonpolar organic diluent in any suitable manner such as by means of chemical reaction with a suitable chemical compound having reduction properties, by irradiation, and the like. This is done to reduce at least a portion, and preferably more than about 30 percent, of the amphoteric metal halide to a lower valence state. The product of the reduction step comprising the diluent and the at least partially reduced amphoteric metal halide is employed as a medium in which olefin polymerization is effected.

The diluent to be employed should be a nonreactive, nonpolar organic medium in which the amphoteric metal halide starting material is soluble to an extent at least sufficient to provide a 0.1 weight percent solution of an amphoteric metal halide starting material. Thus, for example, in preparing the polymerization medium, a 0.1 to 10 weight percent solution of amphoteric metal halide in the diluent may be employed.

Among the diluents that may be employed are saturated aliphatic hydrocarbons preferably containing from about 5 to 10 carbon atoms per molecule. Specific examples of such diluents include pentane, hexane, heptane, octane, decane, nonane, and isomers and mixtures thereof or other saturated petroleum hydrocarbons. A particularly desirable diluent is n-heptane. It will be understood that other hydrocarbon diluents may be used such as aromatic hydrocarbon diluents as exemplified by benzene, xylyene and the like; halogenated hydrocarbons such as monochlrobenzene, dichlorobenzene and the like; gas oil distillate fractions obtained from the catalytic cracking or vis-breaking of gas oil feedstock; Diesel oil; and other similar hydrocarbon fractions. It will be understood that, if desired, mixtures of two or more compatible miscible diluents may be employed. The diluents should be substantially completely free from oxygen, water, and similar compounds of strong polarity which are reactive with the products obtained by reduction of the amphoteric metal halide.

The nonpolar organic liquid in which the slurry is formed may suitably be identical with the diluent in which the catalyst is formed for polymerization of the olefinic hydrocarbons.

The polymerization reaction is suitably conducted at temperatures in the range from about —60° F. to about 400° F., preferably at about room temperature. Higher temperatures may be employed but are generally undesirable in that catalyst decomposition may be encountered. Subatmospheric pressures and pressures up to about 250 atmospheres may be employed in forming the polymer which is produced in accordance with the present invention. It is generally preferable to employ in the polymerization technique a comparatively low pressure, and specifically it is desirable to employ atmospheric pressure. Reaction times may vary within the range from about 10 minutes to about 24 hours.

As a result of subjecting the olefins of the type illustrated before to treatment with the catalyst of the nature described, olefin polymers are formed having the molecular weights recited which are essentially insoluble in the nonpolar organic liquid and form a slurry of polymerized olefins in the nonpolar organic liquid. These polymers are quenched to deactivate any catalyst by adding methanol and the like thereto, and additional quantities of methanol may be added to the slurry to allow separation of the polymer particles. The polymer particles, after separation from the slurry may be treated by adding one or more of several protective compounds thereto. Thus, antioxidant, inhibitor, or stabilizer and the 2,3-dihydroxyquinoxaline in accordance with the present invention may be added severally to together to the polymer particles. Since the polymer particles as recovered from the slurry are in a finely divided state, they have a high surface area and rapidly adsorb oxygen. It is therefore desirable in accordance with the present invention to add the 2,3-dihydroxyquinoxaline and at least one antioxidant, inhibitor, or stabilizer to the solid polymer to prevent color degradation and to impart oxidative, aging, and thermal stability to the composition.

The 2,3-dihydroxyquinoxaline may be suitably added to the polymer by blending it with the polymer pellets and then extruding the blend to provide dispersion.

In adding one or more antioxidant, inhibitor, or stabilizer to the solid polymer, these materials may suitably be employed and incorporated in the solid polymer by forming a solution of the particular protective additive or additives in a suitable solvent such as, for example, an aromatic hydrocarbon, a low boiling ether such as diethyl ether, an aliphatic alcohol such as methanol, or by dissolving the protective additives in a solvent such as xylene, hexane and the like. The protective additives may be sprayed over pellets or particles of the polymer and the resulting mixture may then be extruded through a suitable extrusion device to cause formation of a homogeneous mixture. While it is preferred to add the protective additives as a solution, these materials may suitably be added as such to the polymer particles and the resulting mixture subjected to milling and/or extrusion as desired to cause intimate admixture of the two materials with the polymer composition to form a homogeneous mixture. While extrusion and milling have been described as modes of incorporating not only the 2,3-dihydroxyquinoxaline but also the antioxidant and/or other protective additives into the polymer, other means may suitably be employed so long as the several compounds are thoroughly distributed throughout and admixed with the polymer.

The composition of the present invention is quite important and useful in formation of products such as molded and extruded devices and articles; or the polyolefin composition after suitable addition such as, for example, of dialkyl sulfide and phenolic antioxidants may be formed into films for use in wrapping foodstuffs and other articles; or the polymer composition may be extruded as a filament to be used in weaving and forming of cloth, fibers and other similar materials. Likewise, polyolefins such as polypropylene exhibit poor color and poor stability, caused by the presence of small amounts of multivalent metal contaminants such as catalyst residues including titanium and aluminum; also iron, nickel, copper, silver, and the like. Multivalent metals cause or contribute to degradation of the polymer. An amount of metal in the polymer as little as 1 or 2 p.p.m. may result in serious loss in quality. Polyolefins such as polypropylene are used as electric insulators for copper wire and other metallic conductors which result in contamination of the polypropylene with copper which causes degradation of the polypropylene. The polypropylene may also be used to coat articles composed of multivalent metals. The present invention is quite important and useful because the presence of 2,3-dihydroxyquinoxaline suppresses discoloration and degradation or completely eliminates it. The 2,3-dihydroxyquinoxaline prevents discoloration and degradation even when good color polymer is heated to high temperatures during molding operations, since 2,3-dihydroxyquinoxaline has a high boiling point and is not volatile. The discoloration and degradation may occur even when the polymer has been inhibited with a good oxidative stabilizer system such as commercially available phenolic compounds and dilauryl thiodipropionate, and the like.

In order to illustrate the practice of the present invention, a number of compositions were made up and tested in which 2,3-dihydroxyquinoxaline was added to a high molecular weight solid polyolefin, polypropylene, in contact with copper screen to determine the effect of the 2,3-dihydroxyquinoxaline on oxidative stability, thermal stability and color of the contaminated polymer. Compositions were made up without the 2,3-dihydroxyquinoxaline but with other additives for comparative purposes. The amount of the several additives incorporated into the solid polypropylene and the tests thereof are shown in the following table:

In the foregoing table, Compound II and Compound III are compared with 2,3-dihydroxyquinoxaline (Compound I) to show that compounds of similar structure are ineffective. These Compounds II and III have the structure as shown below:

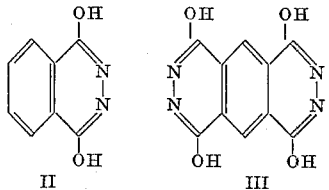

It will be clear from the foregoing data that the present invention is quite important and useful. A particular utility for the invention is as a coating for copper wire used in electrical systems where the polypropylene containing the 2,3-dihydroxyquinoxaline is extruded on to the copper wire.

Other polymer compositions of the present invention in the proportions given may be illustrated by the following:

(1) Polypropylene
2,3-dihydroxyquinoxaline
2,6-di-t-butyl-4-methylphenol
dihexadecylthiodipropionate (2) Polypropylene
2,3-dihydroxyquinoxaline
1-methyl-2,4-dihydroxy-pyrimidine
dioctadecyl sulfide

TABLE I.—EFFECTIVENESS OF 2,3-DIHYDROXYQUINOXALINE IN POLYPROPYLENE

| Sample No. | Stabilizer System | Weight, Percent | Color | $S_r$ | Oxidative Stability,[1] Days |
|---|---|---|---|---|---|
| Control | DLTDP, dipinene-diphenol | .5, .2 | 1 | 1.8 | 4 |
| 1557 | DLTDP, dipinene,diphenol, oxanilide | .5, .2, .5 | [2] 4 | 1.3 | 21 |
| 1558 | DLTDP, topanol CA, oxanilide | .5, .2, .5 | [3] 2 | 2.6 | 22 |
| 1728 | DLTDP, dipinene-diphenol, 2,3-dihydroxyquinoxaline | .5, .15, .5 | [3] 1 | 0.8 | 35 |
| 1729 | DLTPT, topanol CA, 2,3-dihydroxyquinoxaline | .5, .15, .5 | [3] 1 | 1.1 | 29 |
| 1746 | DLTDP, dipinene-diphenol, 1,4-dihydroxyphthalazine (Compound II) | .5, .15, .5 | [2] 3 | 2.1 | 8 |
| 1767 | DLTDP, dipinene-diphenol, (Compound III) | .5, .15, .5 | [4] 5 | 1.0 | 2 |

[1] Copper screen pads aged in U-tube, air, 150° C.
[2] Off-white.
[3] White.
[4] Grey.

It will be seen from the results of the tests in Table I that an improvement in color is obtained when 2,3-dihydroxyquinoxaline is present in the polypropylene polymer. Also, the thermal stability is improved as will be evidenced by the $S_r$ data shown in the table. The $S_r$ value is a direct measure of the thermal stability of a polymer sample, and compares the original intrinsic viscosity of the sample with the intrinsic viscosity of the sample after it has been heat treated in the absence of air at 550° F. for thirty minutes. Likewise, an improvement in oxidative stability is obtained.

In Table I abbreviations have been used to designate additives incorporated in the polypropylene. These additives are identified as follows:

(1) DLTDP: Dilauryl thiodipropionate.
(2) Topanol CA: A trisphenol having the structural formula as follows:

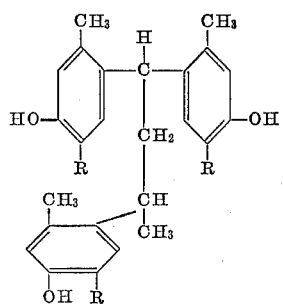

where R=t-butyl.

(3) Polypropylene 2,3-dihydroxyquinoxaline
butylated hydroxyanisole
diheptadecyl sulfide (4) Polypropylene 2,3-dihydroxyquinoxaline
2,6-didodecyl-p-cresol
$4,4^1$-thiobis (3-methyl-6-t-butylphenol)

(5) Polyethylene 2,3-dihydroxyquinoxaline
dilauryl thiodipropionate
topanol CA (6) Ethylene-propylene copolymer 2,3-dihydroxyquinoxaline
dilauryl thiodipropionate
Topanol CA (7) Ethylene-butene-1 copolymer 2,3-dihydroxyquinoxaline
dilauryl thiodipropionate
topanol CA The nature and objects of the present invention having been completely described and illustrated, and the best mode contemplated set forth, what we wish to claim as new and useful and secure by Letters Patent is:

What is claimed is:
1. A polymer composition resistant to the effect of multivalent metal consisting essentially of:
(a) solid poly-alpha mono-olefin of the monomer having 2 to 8 carbon atoms in the molecule;
(b) an effective protective additive in a concentration sufficient to stabilize said poly-alpha mono-olefin against degradation caused by oxidation, heat, aging, and color instability in the absence of multivalent metal tending to promote said degradation selected from the group consisting of dialkyl sulfides having 12 to 30 carbon atoms, dalauryl thiodipropionate, dihexadecyl thiodipropionate, disteoryl thiodipropionate, dibehenyl thiodipropionate, 19,25-dithiahentetetracontane, 19,24 - dithiatetracontane, bis(octadecylmercapto)-p-xylylene, bis(tetradecylmercapto)-p-xylylene, dipinene diphenol, $\alpha^2,\alpha^6$-bis(3-t-butyl-5-methyl-2-hydroxyphenyl) mesitol, 2,6-di-t-butyl-4-methylphenol, 4,4' - thiobis(3 - methyl - 6 - t - butylphenol), 4,4'-1,1-butylidenebis(3-methyl-6-t-butylphenol), 2,6-bis($\alpha$-phenethyl)-4-methylphenol, 2,6-bis(1,1-dimethyl-n-octyl)-4-methylphenol, 2,2'-methylenebis(4-methyl-6-t-butylphenol), 4,4'-methylenebis(2,6-di-t-butylphenol), butylated hydroxytoluene, butylated hydroxyanisole, and 1-methyl-2,4-dihydroxypyrimidine; and
(c) 2,3-dihydroxyquinoxaline in a concentration sufficient to substantially inhibit multivalent metal effect.
2. A composition in accordance with claim 1 in which the protective additive is dipinene diphenol and dilauryl thiodipropionate.
3. A composition in accordance with claim 1 in which the protective additive is a trisphenol having a structural formula:

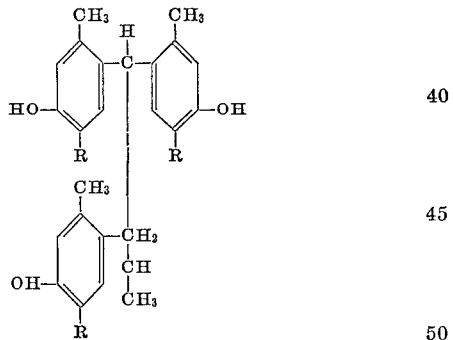

where R=t-butyl and dilauryl thiodipropionate.
4. A composition in accordance with claim 1 in which the mono-olefin is propylene.
5. A composition in accordance with claim 1 in which the mono-olefin is ethylene.
6. A composition in accordance with claim 1 in which the polymer is a copolymer of ethylene and propylene.
7. A composition of matter which consists essentially of:
(a) a solid poly-alpha mono-olefin of the monomer having 2 to 8 carbon atoms in the molecule contaminated with a multivalent metal and containing an effective amount of 2,3-dihydroxyquinoxaline sufficient to overcome the contaminating effects of said metal; and
(b) an effective protective additive in a concentration sufficient to stabilize said poly-alpha mono-olefin against degradation caused by oxidation, heat, aging, and color instability in the absence of multivalent metal tending to promote said degradation selected from the group consisting of dialkyl sulfides having 12 to 30 carbon atoms, dilauryl thiodipropionate, dihexadecyl thiodipropionate, disteoryl thiodipropionate, dibehenyl thiodipropionate, 19,25-dithiahentetetracontane, 19,24-dithiatetracontane, bis(octadecylmercapto)-p-xylylene, bis(tetradecylmercapto) - p - xylylene, dipinene diphenol, $\alpha^2,\alpha^6$-bis(3-t-butyl-5-methyl-2-hydroxy-phenyl)mesitol, 2,6-di-t-butyl-4-methylphenol, 4,4'-thiobis(3-methyl-6-t-butylphenol), 4,4'-1,1-butylidenebis(3-methyl-6-t-butylphenol), 2,6-bis($\alpha$-phenethyl)-4-methylphenol, 2,6-bis(1,1-dimethyl-n-octyl)-4-methylphenol, 2,2'-methylenebis(4-methyl-6-t-butylphenol), 4,4'-methylenebis(2,6-di-t-butylphenol), butylated hydroxytoluene, butylated hydroxyanisole, and 1-methyl-2,4-dihydroxy-pyrimidine.
8. A composition in accordance with claim 7 in which the multivalent metal is aluminum.
9. A composition in accordance with claim 7 in which the multivalent metal is iron.
10. A composition in accordance with claim 7 in which the multivalent metal is copper.
11. A composition in accordance with claim 7 in which the multivalent metal is nickel.
12. A composition in accordance with claim 7 in which the multivalent metal is silver.
13. An article comprising:
(a) a copper surface having a coating of a solid poly-alpha mono-olefin of the monomer having 2 to 8 carbon atoms in the molecule containing effective amounts of:
(i) 2,3-dihydroxyquinoxaline sufficient to overcome the deleterious effects of said copper surface on said poly-alpha mono-olefin; and
(ii) a protective additive in a concentration sufficient to stabilize said poly-alpha mono-olefin against degradation caused by oxidation, heat, aging and color instability selected from the group consisting of dialkyl sulfides having 12 to 30 carbon atoms, dilauryl thiodipropionate, dihexadecyl thiodipropionate, disteoryl thiodipropionate, dibehenyl thiodipropionate, 19,25-dithiahentetetracontane, 19,24 - dithiatetracontane, bis(octadecylmercapto) - p - xylylene, bis(tetradecylmercapto)-p-xylylene, dipinene diphenol, $\alpha^2,\alpha^6$ - bis(3 - t - butyl - 5 - methyl - 2-hydroxyphenyl) mesitol, 2,6-di-t-butyl-4-methylphenol, 4,4' - thiobis(3 - methyl - 6 - t - butylphenol), 4,4' - 1,1 - butylidene - bis(3 - methyl-6-t-butylphenol), 2,6-bis($\alpha$-phenethyl)-4-methylphenol, 2,6-bis(1,1-dimethyl-n-octyl)-4-methylphenol, 2,2'-methylenebis(4-methyl-6-t-butylphenol), 4,4' - methylenebis(2,6 - di - t - butylphenol), butylated hydroxytoluene, butylated hydroxyanisole, and 1-methyl-2,4-dihydroxy-pyrimidine.
14. An article in accordance with claim 13 in which the surface is wire.
15. An article in accordance with claim 13 in which the mono-olefin is propylene.

References Cited
UNITED STATES PATENTS 3,277,045 10/1966 Bonvicini et al. _____ 260—45.8
3,325,448 6/1967 Tanaka et al. _____ 260—45.75

DONALD E. CZAJA, Primary Examiner.

M. J. WELSH, Assistant Examiner.

U.S. Cl. X.R.
260—45.85, 45.95; 106—132